United States Patent [19]

Bauer et al.

[11] Patent Number: 5,564,732
[45] Date of Patent: Oct. 15, 1996

[54] ADJUSTABLE DEPLOYMENT DOOR FOR AIRBAG MODULE

[75] Inventors: John G. Bauer, Troy, Mich.; Daniel L. Steimke, Ogden, Utah; James H. Repp, Monroe, Mich.

[73] Assignees: Morton International, Inc., Chicago, Ill.; Chrysler Corporation, Auburn Hills, Mich.

[21] Appl. No.: 426,071

[22] Filed: Apr. 20, 1995

[51] Int. Cl.[6] .............................. B60R 21/20; B60R 21/22
[52] U.S. Cl. ...................... 280/728.3; 280/732; 403/353
[58] Field of Search .............................. 280/728.3, 728.2, 280/732, 731, 730.1, 728.1; 403/353; 220/324

[56] References Cited

U.S. PATENT DOCUMENTS

| | | | |
|---|---|---|---|
| 1,055,522 | 3/1913 | Cumming | 403/353 |
| 5,060,972 | 10/1991 | Satoh et al. | 280/728.3 |
| 5,127,669 | 7/1992 | Suran et al. | 280/732 |
| 5,143,331 | 9/1992 | Robert | 403/353 |
| 5,332,257 | 7/1994 | Rogers et al. | 280/728.3 |
| 5,398,961 | 3/1995 | Rogers et al. | 280/728.3 |
| 5,407,224 | 4/1995 | Bauer et al. | 280/728.2 |
| 5,431,433 | 7/1995 | Steimke et al. | 280/728.3 |
| 5,456,488 | 10/1995 | Bauer | 280/728.1 |

OTHER PUBLICATIONS

Research Disclosure, No. 36904, disclosed anonymously.
Research Disclosure, No. 36945, disclosed anonymously.
Research Disclosure, No. 37165, disclosed anonymously.

Primary Examiner—Anne Marie Boehler
Assistant Examiner—Peter C. English
Attorney, Agent, or Firm—Parmelee, Bollinger & Bramblett; George W. Rauchfuss, Jr.

[57] ABSTRACT

An airbag module installed in a vehicle comprises a deployment door which comprises a face panel which covers the open top of a reaction canister and is positioned at an opening in the instrument panel of the vehicle and further comprises key and keyway connecting structure for securely holding the deployment door to the reaction canister before and during deployment of an airbag. This connecting structure allows limited movement of the deployment door in three directions with respect to the reaction canister and thus permits adjustment of the position of the face panel of the deployment door to obtain accurate fit and finish at the instrument panel. In preferred embodiments the invention further comprises structure for immovably fixing the position of the deployment door at the instrument panel after the deployment door has been adjusted. Reaction forces acting on the deployment door during deployment and inflation of the airbag are transmitted to the reaction canister through the adjustable connection that fastens the deployment door to the reaction canister, thereby avoiding transmission of damaging reaction forces to the instrument panel.

18 Claims, 3 Drawing Sheets

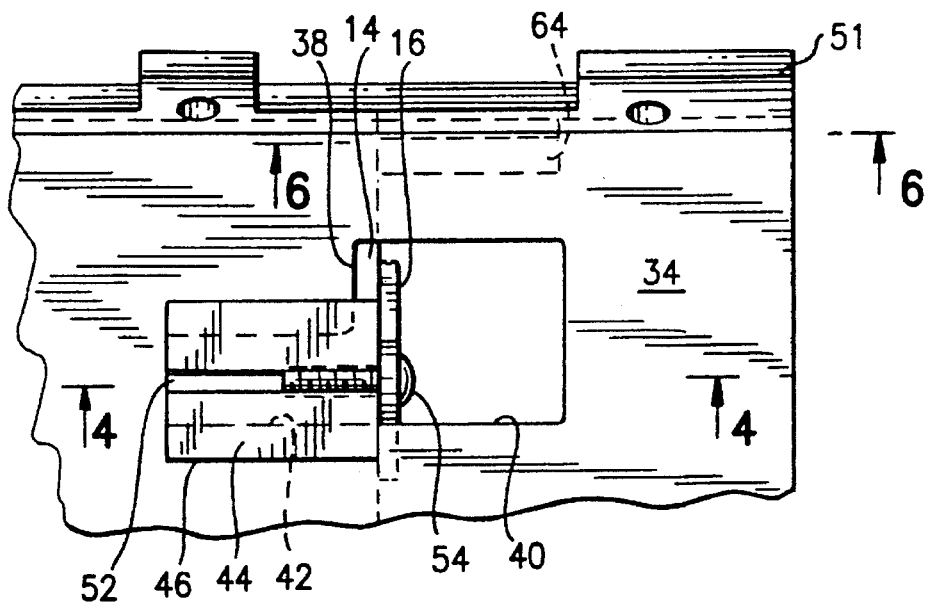
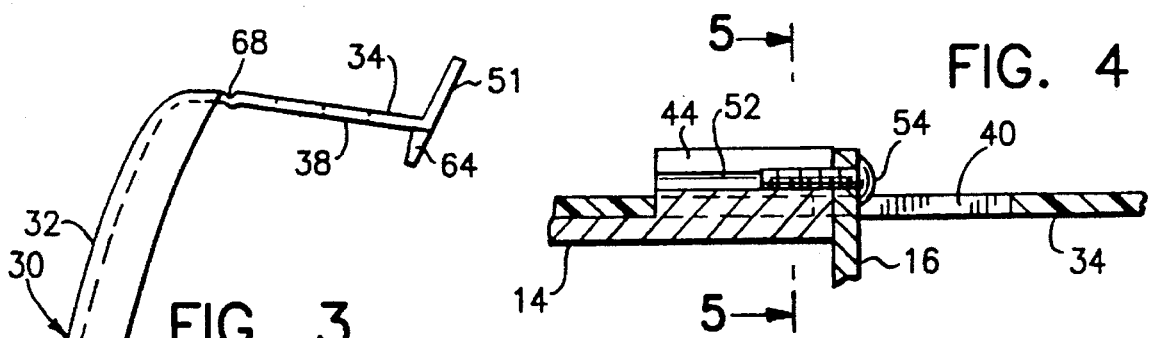
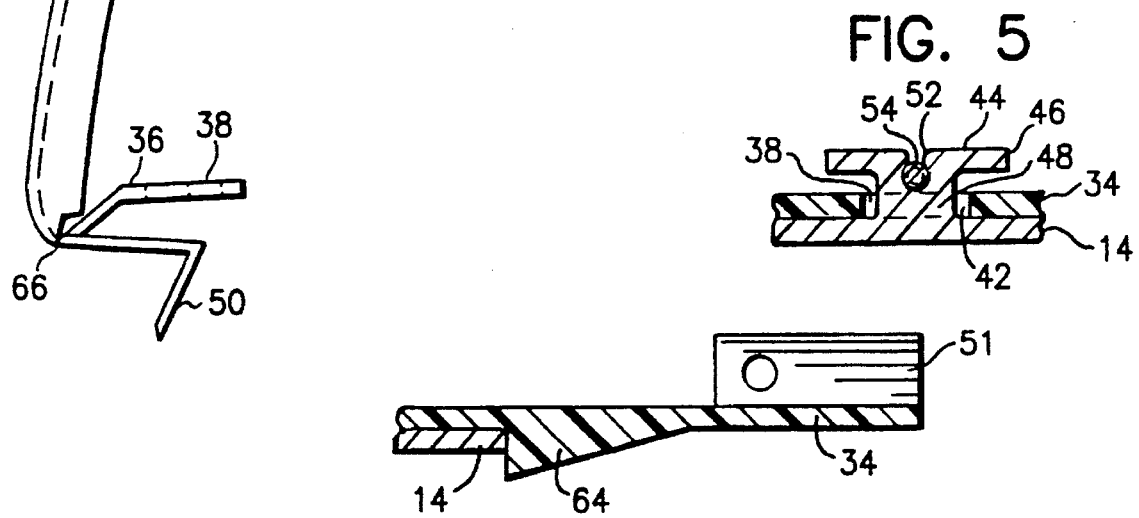

ADJUSTABLE DEPLOYMENT DOOR FOR AIRBAG MODULE

FIELD OF THE INVENTION

The invention relates to improvements in airbag restraint systems for automobile passenger safety, and more particularly to an adjustable deployment door on an airbag module and improved connections and methods for installing the adjustable deployment door in such systems.

BACKGROUND OF THE INVENTION

Airbag modules currently used in automobiles comprise a reaction canister containing an inflator for rapid generation of gas to inflate an airbag. The inflator is activated upon rapid deceleration of the automobile as in a collision. Gas issues from the inflator into the reaction canister and thence flows into the airbag which is folded and stored inside an airbag container which is fastened to or is a part of the reaction canister. Generally the reaction canister has a bottom, sidewalls and end walls. The side and end walls form a trough-shaped airbag container for storing the folded airbag. The airbag has an open mouth connected to the reaction canister for flow of gas from the reaction canister into the airbag to inflate the airbag.

The top of the airbag container is an open end from which the airbag will be deployed as it is inflated. The canister is installed in a vehicle with the open top of the airbag container just below the instrument panel. This open top of the airbag container is covered by a face panel of a deployment door which is fastened to the reaction canister either directly or through other members of the airbag module. The face panel of the deployment door is designed for placement at an opening which is provided on the vehicle instrument panel for deployment of the airbag through that opening. Typically the face panel is made from the same material as, or a material that matches the instrument panel, usually a flexible molded plastic.

The airbag module is installed in the vehicle by attaching the reaction canister to structural support members in the vehicle beneath the instrument panel. The module is positioned there with the open top of the airbag container at an opening that is provided in the instrument panel. The deployment door is fastened to the reaction canister by connections near the edges of the airbag container at its open top.

The deployment door is held shut by breakable means such as a breakable tear seam on the face panel of the deployment door. By the force of the airbag pressing against the deployment door as the airbag begins to be inflated, the breakable means will be broken or torn and the door will open to give way for deployment of the airbag from its container and through the opening in the instrument panel. As inflation proceeds, the deployed airbag will expand into the passenger compartment of the vehicle.

The deployment door not only covers the open top of the airbag container or reaction canister to hold the folded airbag inside the container or canister but it also covers an opening in the instrument panel which is provided for deployment of the airbag. The face panel of the deployment door is a visible part on the outer surface of the instrument panel and it is usually designed to match the decor of the instrument panel.

An airbag module must be installed with secure fastening of its several elements to the reaction canister. The fastenings must be strong enough to resist disintegration of the module under sudden forces that are exerted as the inflator is actuated and the airbag is inflated and deployed. The reaction canister absorbs reaction forces from the several elements of the module and transmits those forces from the module to the vehicle through structural members to which the reaction canister is fastened in the vehicle. It is important that the deployment door remains attached to the airbag module when the door is forced open by impact of the deploying airbag. If the deployment door were attached only to the instrument panel, reaction to the force required to open the deployment door would be transmitted only to the instrument panel, which might cause the deployment door to break loose and be hurled into the passenger compartment; or such forces might damage the instrument panel.

A frequent problem in the installation of airbag modules with conventional deployment doors is poor fit and finish between the instrument panel and the deployment door. When the airbag module is installed with the deployment door fixed immovably to the reaction canister, it is often difficult to obtain the desired accuracy of fit and finish between the face panel of the deployment door and the instrument panel. The airbag module is installed in the vehicle by fastening the reaction canister to structural members of the vehicle under the instrument panel. There may be an accumulation of several tolerance variations between the vehicle members to which the reaction canister is fastened and the instrument panel surface, which may cause inaccurate fit and finish at the instrument panel.

BRIEF DESCRIPTION OF THE INVENTION

The invention provides an airbag module with an adjustable deployment door. The module comprises means for generating gas for inflation of an airbag, a reaction canister containing the gas generating means with means for transmission of gas from the gas generating means to an airbag which is attached to the reaction canister for inflation of the airbag, and an airbag container which houses the folded airbag prior to inflation. Preferably, the airbag container housing is an open ended trough defined by end walls and sidewalls of the reaction canister and a diffuser plate which separates the airbag container and the gas generator at the bottom of the canister. The airbag container has an open top through which the airbag can be deployed when inflated. The airbag module further comprises a deployment door which comprises a face panel covering the open top of the airbag container and connecting means for securely holding the deployment door to the reaction canister before and during deployment of the airbag.

In accordance with the invention, that connecting means allows limited movement of the deployment door in three directions with respect to the reaction canister. This permits adjustment of the final position of the face panel of the deployment door to obtain accurate fit and finish in the instrument panel after the airbag module has been installed in a vehicle. In some preferred embodiments, the invention may further comprise means for immovably fixing the position of the deployment door at the instrument panel after the position of the deployment door has been adjusted to fit the instrument panel.

Reaction forces acting on the deployment door during deployment and inflation of the airbag can be transmitted through the adjustable connection that fastens the deployment door to the reaction canister, thereby avoiding transmission of damaging reaction forces to the instrument panel. Some preferred embodiments of the invention will be described in more detail with reference to the Drawings.

DESCRIPTION OF THE DRAWINGS

FIG. 2 is a partial top plan view showing detail of the connecting means for connecting the deployment door to the reaction canister or airbag container.

FIG. 3 is an end view of a deployment door.

FIG. 4 is a cross section view along line 4—4 in FIG. 2.

FIG. 5 is a cross section view along line 5—5 in FIG. 4.

FIG. 6 is a cross section taken along line 6—6 in FIG. 2.

DETAILED DESCRIPTION OF PREFERRED EMBODIMENTS

Figure 1:
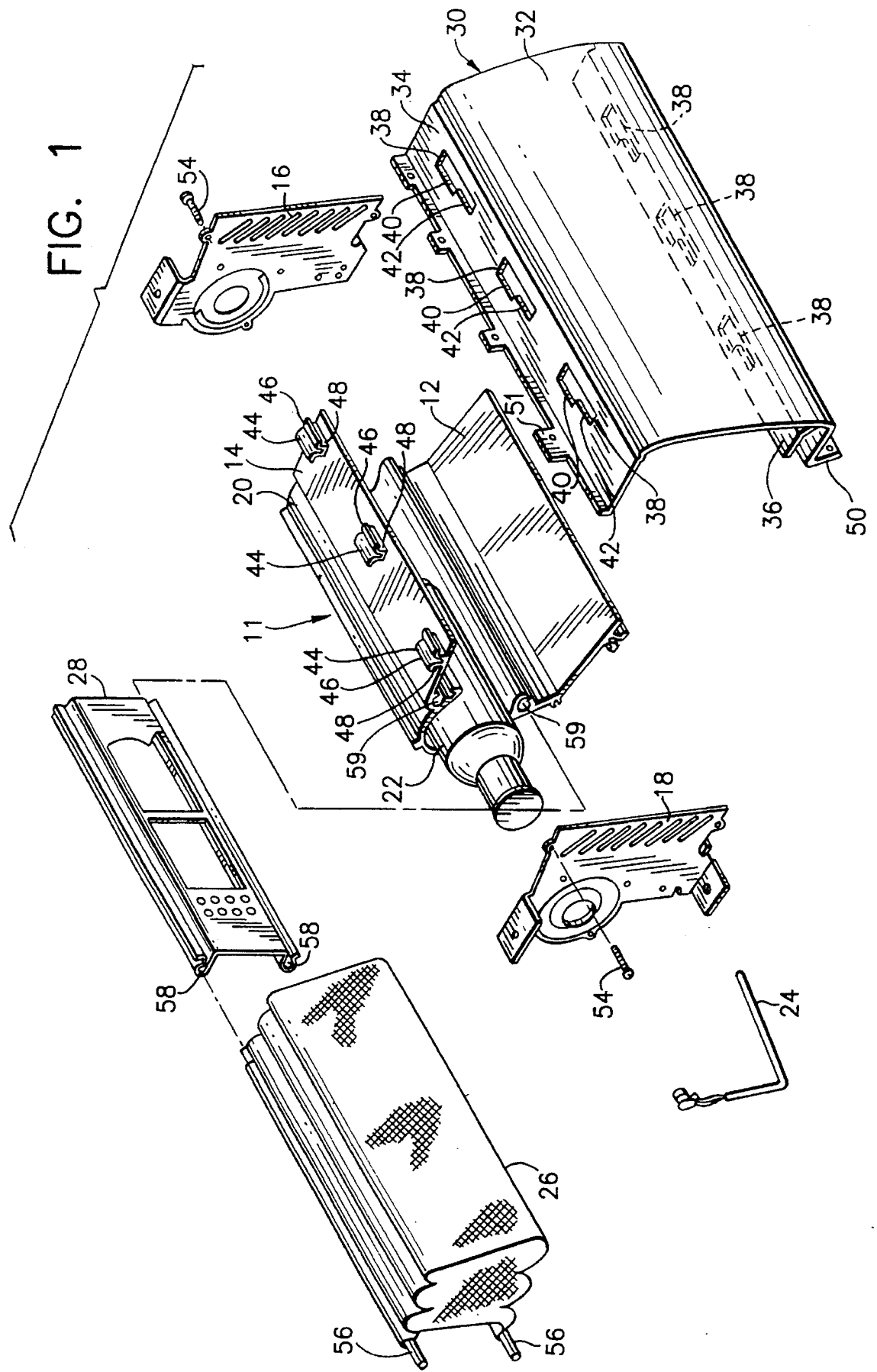
FIG. 1 is an exploded perspective view showing several parts of an airbag module embodying the invention.

Referring now to FIG. 1, an airbag module, comprises a reaction canister 11, an inflator 22 inside the reaction canister near the bottom of the reaction canister 11, and further comprises an airbag 26 inside the reaction canister 11, and a deployment door 30 covering the open top of the canister 11. An electrical conductor 24 is connected at one end of the inflator 22 to an igniter (not shown) inside the inflator and the conductor leads away to a deceleration detector (not shown) in the vehicle.

The reaction canister 11 is a trough-like container defined by a hemi-cylindric bottom 20, opposed sidewalls 12 and 14 extending outward from the bottom 20, end walls 16 and 18 covering opposed ends of the canister 11, and a transverse diffuser plate 28 which is attached to the canister 11 and extends across the inside of the reaction canister 11 between the sidewalls 12 and 14 where those walls join the bottom 20. The diffuser plate separates a chamber containing the inflator 22 in the bottom 20 of the canister 11 and an airbag container between the diffuser plate 28 and the open top of the canister 11. The airbag container in the embodiment shown is an integral part of the reaction canister, defined by the sidewalls 12 and 14, and end walls 16 and 18. It extends from the diffuser plate 28 outward to the open top of the canister 11.

An airbag 26 is folded inside the airbag container with the mouth of the airbag 26 attached to the diffuser plate 28. Gas will flow from inflator 22 through the diffuser plate 28 into the mouth of the airbag 26.

A deployment door 30 is fastened to the reaction canister 11 and covers the open top of the canister. The deployment door 30 comprises a face panel 32 which covers the airbag container at the open top of the reaction canister 11 and further comprises two side panels 34 and 36 extending at angles, generally essentially perpendicularly, from the inner side of the face panel 32 for attachment of the door 30 to the reaction canister 11. Each of the two side panels 34 and 36 on the deployment door 30 has a plurality of longitudinal keyways 38 spaced apart along its length near the distal edge of the side panel.

FIG. 2 shows the detail of the adjustable connection of one keyway 38 and one T-shaped key 46. The key 46 shown in FIG. 2 is standing on the sidewall 14 at one edge of the sidewall 14. Each of the longitudinal keyways 38 in the side panels 34 and 36 comprises a wide section 40 at one end of the keyway 38 and a narrow section 42 at the other end. The heads 44 at the outer ends of opposed T-shaped keys 46 on the sidewalls 12 and 14 can pass through the wide sections 40 of the keyways 38 in the side panels 34 and 36 but cannot pass through the narrow sections 42. The stems 48 of the T-shaped keys 46, however can pass into the narrow sections 42 of the keyways 38.

As shown in FIG. 3, the deployment door 30 may further comprise fastening members 50 and 51 at the distal ends of side panels 34 and 36 which members provide a preferred means for immovably fixing the position of the deployment door 30 in the vehicle, after adjustment of the position of the deployment door 30, by attaching the fastening members 50 and 51 to structural members of the instrument panel on its under side.

The reaction canister sidewalls 12 and 14 are fitted on their outer surfaces with a plurality of standing keys 46 spaced apart along longitudinal lines on the outer surfaces of sidewalls 12 and 14 near the open top of the trough-shaped reaction canister 11. As shown in FIG. 5 each of the standing keys 46 has a narrow stem 48 attached to and extending outward from the sidewalls 12 and 14 of the reaction canister 11 and a wider head 44 at the distal end of the stem 48. The standing keys 46 are positioned on the sidewalls 12 and 14 of the reaction canister for engagement with corresponding longitudinal keyways 38 in the side panels 34 and of the deployment door 30.

Shown in FIG. 1 on the outside of one of the sidewalls 14 of the reaction canister are three standing keys 46, spaced apart symmetrically on a line parallel to and near the longer edges of the sidewalls 34 and 36 at the open top of the reaction canister 11.

In the embodiment shown, the body of the reaction canister 11, except the end walls 16 and 18, is a unitary aluminum extrusion product which comprises the curved bottom 20 and the sidewalls 12 and 14 of the reaction canister 11 and a number of sleeves with longitudinal slots for connecting other members of the airbag module to the reaction canister 11, as discussed hereinafter. Those walls, bottom, and sleeves are formed by extrusion as integral parts of the reaction canister 11. The keys 46 on the sidewalls 12 and 14 of the reaction canister 11 can also be formed by extrusion as integral parts of the reaction canister. To do this, the unitary extrusion product is formed with a continuous linear boss having a T-shaped key cross section standing along the outer surface of sidewalls 12 and 14 of the reaction canister 11 near its open top. Portions along the length of the continuous boss are then machined away leaving the standing keys 46 spaced apart on lines along the length of the each of the reaction canister sidewalls 12 and 14.

The stem 48 and the head 44 of each key 46 are of the same length along the axis of extrusion but the head 44 is wider in cross section than the stem 48. In some preferred embodiments a key 46 may further comprise a retaining screw groove 52, formed during extrusion, in the top of the head 44 along the center line of the key 46, as best illustrated in FIGS. 2, 4 and 5. The retaining screw grooves 52 in keys 46 standing at the edges of the sidewalls 12 and 14 are used to fasten the end walls 16 and 18 to the sidewalls 14 and 16 by means of self-threading screws 54, as shown in FIGS. 2 and 4.

The invention is not limited to use with a reaction canister that has been formed by extrusion. Keys can be formed on walls of a reaction canister or an airbag container made in other ways and from other materials. For example, other suitable standing keys with narrow stems and wide heads can be formed on the walls of an airbag container or reaction canister made from sheet metal by metal stamping or such keys can be attached individually by welding or other means. The essential structure is a key standing on the outer wall surface of the reaction canister or a member attached thereto and comprising a narrow stem supporting a wider head.

In the assembly of airbag module 10, as shown in FIG. 1, after the inflator 22 is placed inside the curved bottom 20 of the reaction canister 11 and the mouth of the airbag 26 is fastened to the diffuser plate 28 by means of retaining rods 56 held inside longitudinal sleeves 58 on opposed peripheral edges of the diffuser plate 28. The diffuser plate 28 is fastened to the canister 11 separating the airbag container from the inflator 22 by slipping sleeves 58 in retaining grooves 59 on the inside wall of the canister. The airbag 26 is folded inside the airbag container. The end walls 16 and 18 of the canister are attached to the ends of sidewalls 12 and 14 and the electrical conductor 24 is suitably attached to inflator 22. The airbag module 10 is now ready for attachment of deployment door 30 to the reaction canister 11.

To connect the deployment door 30 to the reaction canister 11, the face panel 32 of the deployment door is placed over the open top of the canister and the side panels 34 and 36 of the deployment door are brought down against opposed sidewalls 12 and 14 of the airbag reaction canister, passing the wider heads 44 of the keys 46 on the reaction canister through the wide sections 40 of keyways 38 on the side panels 34 and 36. From the position with the keys 46 standing in the wide sections of the keyways 38, the deployment door 30 is moved lengthwise to bring the stems 48 of the keys 46 into the narrow sections 42 of the keyways 38. Now the narrow sections 42 of the keyways 38 are under the larger heads 44 of the keys. FIGS. 2, 4 and 5 show detail of the structure of the adjustable connection joining the deployment door 30 to the reaction canister 11 at one of the keys 46 on the reaction canister. The key 46 is shown with its stem 48 inside the narrow section 42 of the corresponding keyway 38.

The deployment door 30 covers the open top of the reaction canister 11 and the keys 46 in the keyways 38 connect the door to the canister 11. The connection allows a limited degree of play between the engaged keyways 38 and keys 46 to permit limited freedom of movement of the deployment door 30 with respect to the reaction canister 11. The length and width of the narrow section 42 of the keyway 38 are larger than the length and width of the stem 48 of the key 46, and the height of the stem 48 below the head 44 of the key is larger than the thickness of the side panels 34 and 36, by limited amounts that will allow a degree of free movement of the deployment door 30 in at least three directions while at the same time securely fastening the deployment door 30 to the reaction canister 11. This freedom of movement may be needed to make accurate adjustment of the fit and finish of the deployment door 30 in the instrument panel after the reaction canister 11 has been installed in the vehicle. After the deployment door 30 has been adjusted for accurate fit and finish it can be fixed in position to maintain accurate fit and finish by fastening it immovably to the instrument panel by means of fastening members 50 and 51 on the under side of the deployment door which can be fastened, for example by screws or stakes, to the instrument panel by means of corresponding structural members provided for this purpose on the under side of the instrument panel.

To prevent the deployment door 30 from sliding back so that keys 46 would move out of the narrow sections 42 of the keyways 38 into the wide sections 40, any locking means suitable for that purpose can be used. The locking means should not interfere with the limited adjustability of the connection. A preferred locking means, shown in FIGS. 2 and 3 and 6, is a ramp 64 molded on the under surface of the side panel 34 of the deployment door 30. The ramp 64 is located on the under surface of the side panel at a point where the ramp 64 will slide over the surface of the sidewall 12 or 14 of the canister 11 until the stem 48 of the key 46 is inside the narrow section 42 of the keyway and then the ramp 64 will slide off and catch the edge of the sidewall 12 or 14. As the deployment door 30 is moved lengthwise along the reaction canister sidewalls 12 and 14 to bring the keys 46 into the narrow sections 42 of the keyways 38, as described above, the side panels 34 and 36 of the deployment door SO are flexible enough so the ramp 64 on the under side of the side panel can slide over the surface of the sidewall of the canister 11. When the keys 46 have been brought into the narrow sections 42 of the keyways 38, the ramp 64 has moved past the edge of the canister 11. The resilience of the side panel snaps the side panel down towards the canister surface and thus moves the ramp 64 downward so it will engage the edge of the canister. The ramp engaging the edge of the canister then prevents the deployment door 30 from sliding back lengthwise. Thus, the narrow section 42 of the keyway 38 is held in position under the wider head 44 of the key 46 so the deployment door 30 is securely held to the reaction canister 11 by the adjustable connection.

FIGS. 2 and 4 illustrate the use of self-threading screws 54 which can be removably fastened into retaining screw grooves 52 formed along the top of the keys 46. The screws 54 are inserted through holes in the end walls 16 and 18 of the canister 11 and screwed into center grooves 52 of keys 46 standing at each end of the sidewalls 12 and 14 on the canister 11. This secures the end walls 16 and 18 to the sidewalls 12 and 14 near the open top of the canister.

Figure 7:
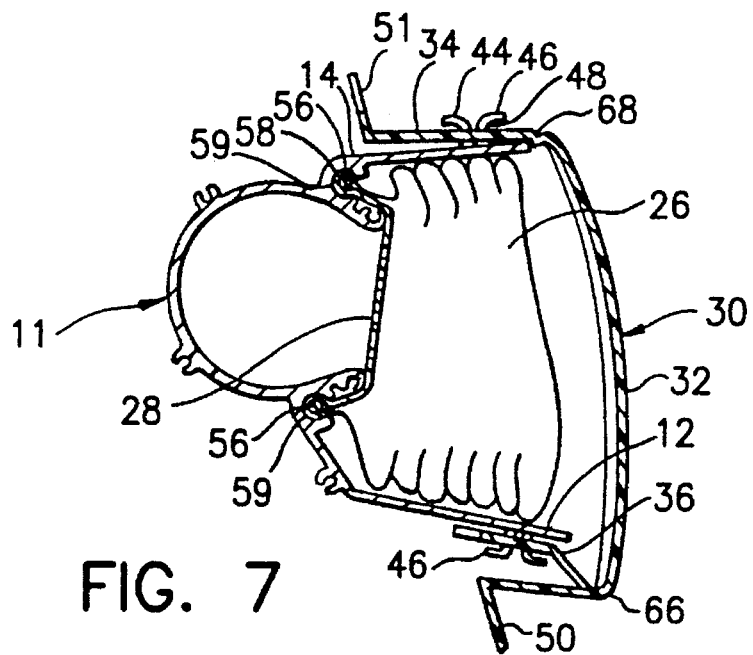
FIG. 7 is a side cutaway section of a reaction canister with an airbag folded inside the reaction canister and covered by a deployment door which is fastened to the reaction canister in accordance with the invention.
Figure 8:
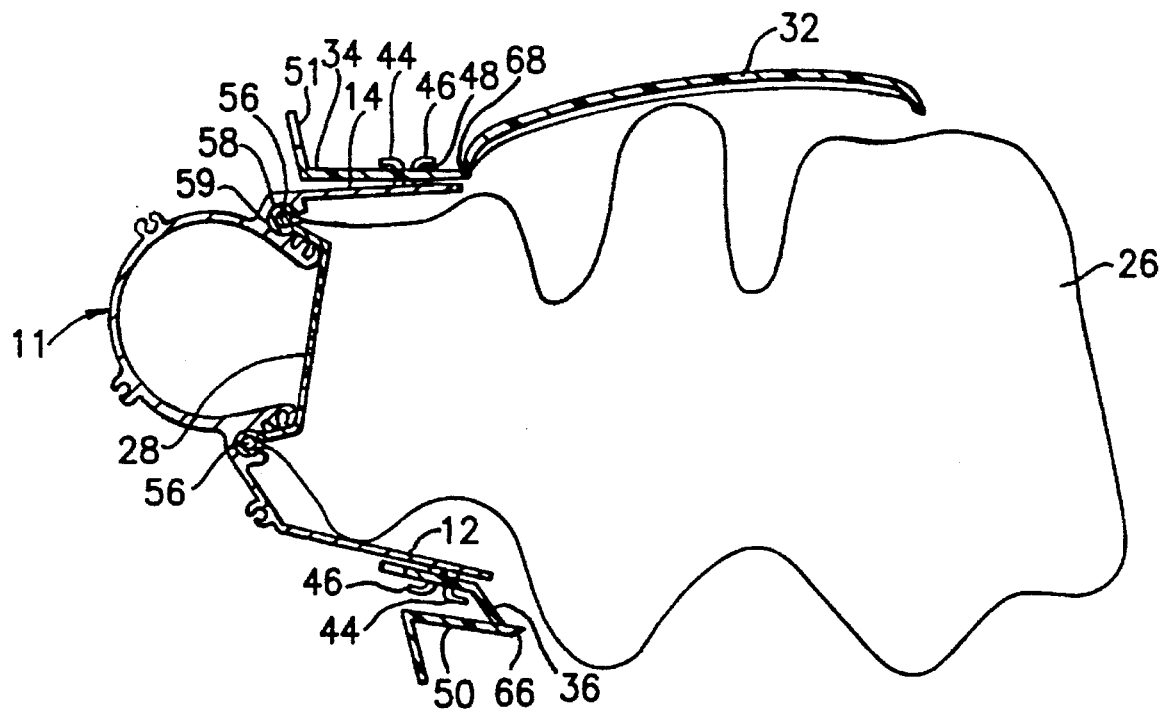
FIG. 8 is a side cutaway section as in FIG. 7 but with the deployment door opened and the airbag deployed and partially inflated.

FIG. 7 shows an airbag module with the airbag 26 folded and stored inside the reaction canister 11 and a deployment door 30 covering the open top of the canister. The deployment door 30 is fastened to opposite sidewalls 12 and 14 of the reaction canister 11 by means of keyways 38 on the side panels 34 and 36 of the deployment door engaging keys 46 on the sidewalls of the reaction canister as described above. One side panel is fastened to the face panel by a breakable tear seam 66 which holds the door shut until the tear seam is broken or torn by impact of the airbag 26 against the face panel 32 as the airbag is being deployed. When the tear seam 66 is broken, the face panel 32 is pushed away by the deploying airbag 26 and swings open on a hinge 68 which holds the face panel to the other side panel, making way for deployment of the airbag from the reaction canister as shown in FIG. 8.

In the foregoing specific example the airbag container is an integral part of the reaction canister 11, so the deployment door 30 is attached directly to the reaction canister 11 and the keys 46 are standing on the reaction canister. In other airbag modules embodying the invention a deployment door may be connected indirectly to the reaction canister through other members of the airbag module, e.g. connected to an airbag container on which the keys are standing and which in turn is attached to the reaction canister. In other embodiments the airbag container may be defined partly or entirely by extended side and end panels of the deployment door, which extended panels are connected to a reaction canister by an adjustable connection in accordance with the invention. In all of those cases the deployment door is connected by an adjustable connection, either directly or indirectly, to the reaction canister.

With the foregoing description of the invention, those skilled in the art will appreciate that modifications may be made to the invention without departing from the spirit thereof. Therefore, it is not intended that the scope of the invention be limited to the specific embodiments illustrated and described. The foregoing and other variations and equivalents of the invention described are within the intended scope of the invention defined by the following claims.

We claim:

1. An airbag module for installation in an instrument panel or dashboard of a vehicle comprising:

means for generating gas for inflation of an airbag;

a reaction canister housing said gas generating means;

an inflatable airbag attached to the reaction canister for inflation of the airbag by gas transmitted from the gas generating means;

an airbag container integral with the reaction canister and housing the inflatable airbag, said airbag container having an open top through which the airbag can be deployed when inflated;

a deployment door comprising a face panel covering said open top of the airbag container and a pair of side panels extending from the face panel;

connecting means for securely holding the deployment door to the reaction canister before and during deployment of the airbag, said connecting means allowing limited movement of the deployment door in three directions with respect to the reaction canister for adjustment of the face panel of the deployment door with respect to the instrument panel or dashboard after the airbag module has been installed in a vehicle and comprising:

a plurality of longitudinal keyways in each of said side panels, each keyway comprising a wide section at one end of the keyway and a narrow section at an opposite end of the keyway;

a plurality of standing keys standing on outer surfaces of sidewalls of said reaction canister;

said standing keys being located for engagement of said keys with said keyways to connect the deployment door to the reaction canister, said standing keys each comprising a stem which can pass from the wide section into the narrow section of one of said keyways and a head at the distal end of said stem, which head can pass through said wide section of the keyway but cannot pass through said narrow section of the keyway, and wherein the connecting means comprises said keys on the reaction canister standing inside the narrow sections of said keyways in the side panels of the deployment door.

2. An airbag module according to claim 1 further comprising means for immovably fixing the deployment door to the instrument panel after adjustment of the face panel of the deployment door with respect to the instrument panel of the vehicle.

3. An airbag module according to claim 1 wherein the deployment door further comprises fastening members for fastening of the deployment door to the instrument panel of the vehicle to immovably fix the deployment door in position after adjustment of the face panel of the deployment door with respect to the instrument panel.

4. An airbag module according to claim 1 further comprising locking means for holding the standing keys in the narrow sections of the keyways by limiting lengthwise sliding of the deployment door after the stems have passed from the wide sections of the keyways into the narrow sections of the keyways.

5. An airbag module according to claim 4 wherein said locking means comprises a ramp on an underside of at least one of the side panels of the deployment door that engages an edge of the sidewalls of the reaction canister when the keys on the canister stand in the narrow sections of the keyways on the side panels of the deployment door.

6. An airbag module according to claim 4 wherein the deployment door further comprises fastening members for fastening of the deployment door to the instrument panel in the vehicle to immovably fix the deployment door in position after adjustment of the face panel of the deployment door with respect to the instrument panel.

7. An airbag module according to claim 1 further comprising a retaining screw groove running along a center line at the top of each of the keys.

8. An airbag module according to claim 7 further comprising a screw extending through a hole in an endwall of the reaction canister and screwed into at least one of the retaining screw grooves in the top of the keys on one of the sidewalls of the reaction canister.

9. An airbag module for installation in an opening in an instrument panel or dashboard of a vehicle comprising:

an inflator for generating inflation gas;

a reaction canister having an open top and opposed sidewalls and end walls and a bottom, said canister housing said inflator and a folded inflatable airbag having an open mouth positioned in said canister for receiving inflation gas from said inflator;

a deployment door having a face panel covering said open top of the reaction canister and two side panels extending from said face panel, said face panel being designed to fit in an opening in the instrument panel or dashboard of a vehicle;

connecting means for securely connecting said deployment door to the reaction canister while permitting limited movement of the deployment door in three directions with respect to the reaction canister to permit adjustment of the deployment door with respect to said opening in the instrument panel or dashboard of the vehicle to obtain an accurate fit and finish of the face panel in the instrument panel or dashboard, said connecting means comprising:

a plurality of longitudinal keyways in each of the side panels of the deployment door, each of said keyways having a narrow section at one end of said keyways and a wide section at an opposite end of said keyways;

a plurality of generally T-shaped standing keys on outer surfaces of the sidewalls of the reaction canisters, each of said T-shaped keys comprising a stem and head, each one of said heads capable of passing only through the wide section of one of said keyways and each one of said stems capable of passing through both the wide and narrow sections of one of said keyways; and wherein said connecting means is defined by said stems of said keys on the reaction canister sidewalls standing inside the narrow sections of said keyways in said side panels of the deployment door.

10. An airbag module according to claim 9 wherein the deployment door further comprises fastening members for fastening of the deployment door to members of the instrument panel to immovably fix the deployment door in position after adjustment of the face panel of the deployment door with respect to the instrument panel or dashboard of the vehicle.

11. An airbag module according to claim 9 further comprising locking means for holding the standing keys in the narrow sections of the keyways by limiting lengthwise sliding of the deployment door after the stems have passed from the wide to the narrow sections of the keyways, 12. An airbag module according to claim 11 wherein said locking means comprises a ramp standing on an under surface of at least one of the side panels of the deployment door at a point where the ramp will slide over and catch an edge of at least one of the sidewalls of the canister as the stems of the keys are moved into the narrow sections of the keyways.

13. An airbag module according to claim 9 further comprising a retaining screw groove running along a center line at the top of each of the keys.

14. An airbag module according to claim 13 further comprising a screw extending through a hole in at least one end wall of the canister and screwed into at least one of the retaining screw grooves of the keys on one of the sidewalls of the canister.

15. An airbag module according to claim 14 wherein the deployment door further comprises fastening members for fastening of the deployment door to immovably fix the deployment door in position in the vehicle after adjustment of the face panel of the deployment door with respect to the instrument panel of the vehicle.

16. An airbag module according to claim 13 wherein the deployment door further comprises fastening members for fastening of the deployment door to immovably fix the deployment door in position after adjustment of the face panel of the deployment door with respect to the instrument panel of the vehicle.

17. In an airbag module comprising a reaction canister housing an inflatable airbag, an inflator for providing inflation gas and a deployment door to fit in an opening in an instrument panel or dashboard of a vehicle, said deployment door connected to said reaction canister before and during deployment of the airbag, the improvement comprising connecting means for connecting said deployment door to said reaction canister, said connecting means comprising:

a plurality of longitudinal keyways on said deployment door, each keyway comprising a wide section at one end of the keyway and a narrow section at an opposite end of the keyway, and a plurality of standing keys on said reaction canister, each said standing keys being positioned for engagement of said key with one of said keyways whereby the key is insertable only into the wide section of the keyway and slidable therefrom into the narrow section of the keyway and said connecting means is defined by said keys on the reaction canister standing inside the narrow section of said keyways on the deployment door.

18. An airbag module according to claim 17 wherein each of said standing keys comprises T-shaped keys each having a stem and a head wider than the stem and wherein each one of said stems can pass longitudinally from the wide section into the narrow section of one of said keyways and said wider head can pass through said wide section of said one of said keyways but not through the narrow section of said one of said keyways, and wherein said connecting means further comprises locking means for holding the standing keys in the narrow sections of the keyways.

* * * * *